United States Patent
Smits et al.

(10) Patent No.: US 8,894,954 B2
(45) Date of Patent: Nov. 25, 2014

(54) PROCESS FOR REMOVING MERCAPTANS FROM A GAS STREAM

(75) Inventors: Jozef Jacobus Titus Smits, Amsterdam (NL); Sipke Hidde Wadman, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/991,453

(22) PCT Filed: Nov. 30, 2011

(86) PCT No.: PCT/EP2011/071365
§ 371 (c)(1),
(2), (4) Date: Jul. 18, 2013

(87) PCT Pub. No.: WO2012/076378
PCT Pub. Date: Jun. 14, 2012

(65) Prior Publication Data
US 2014/0294708 A1  Oct. 2, 2014

(30) Foreign Application Priority Data
Dec. 6, 2010 (EP) .................................... 10193844

(51) Int. Cl.
*B01D 53/48* (2006.01)
*C10L 3/10* (2006.01)
*C09K 3/00* (2006.01)
*B01D 53/14* (2006.01)

(52) U.S. Cl.
CPC ........ *B01D 53/1493* (2013.01); *B01D 53/1487* (2013.01); *B01D 53/1475* (2013.01); *B01D 53/1468* (2013.01)
USPC .................. 423/242.1; 423/242.2; 423/242.7; 423/243.01; 423/226; 48/127.3; 48/127.5; 252/184; 252/189; 95/235

(58) Field of Classification Search
USPC ........... 423/242.1, 242.2, 242.7, 243.01, 226; 48/127.3, 127.5; 252/184, 189; 95/235
See application file for complete search history.

(56) References Cited

U.S. PATENT DOCUMENTS

| | | | |
|---|---|---|---|
| 4,020,144 | A | 4/1977 | Bosniack |
| 4,020,149 | A | 4/1977 | Bosniack |
| 4,705,620 | A | 11/1987 | Bricker et al. |
| 8,419,832 | B2 | 4/2013 | Capdeville et al. |
| 2013/0302233 | A1 * | 11/2013 | Smits et al. .................... 423/226 |

FOREIGN PATENT DOCUMENTS

| | | |
|---|---|---|
| CN | 101374588 | 2/2009 |
| EP | 2025386 | 2/2009 |
| FR | 2928563 | 9/2009 |
| FR | 2953147 | 6/2011 |
| GB | 1551344 | 8/1979 |
| WO | 03062177 | 7/2003 |
| WO | 2009156621 | 12/2009 |
| WO | 2010060975 | 6/2010 |

* cited by examiner

*Primary Examiner* — Timothy Vanoy

(57) ABSTRACT

The present invention provides a process for removing mercaptans from a gas stream gas stream, comprising the steps: a) providing a first mercaptan-comprising gas stream comprising at least a mercaptan of the general formula: $R_1$—SH, wherein $R_1$ is an alkyl group comprising 1 to 4 carbon atoms; and b) contacting the mercaptan-comprising gas stream with an absorption medium comprising a substituted disulphide and a nitrogen-containing base to obtain a second mercaptan-depleted gas stream, wherein: the substituted disulphide is of the general formula $R_2$—SS—$R_3$ wherein: $R_2$ and $R_3$ are carbon comprising substituents of which the corresponding $R_2$—SH and $R_3$—SH thiols have a vapor pressure below the vapor pressure of any $R_1$—SH thiol.

12 Claims, No Drawings

PROCESS FOR REMOVING MERCAPTANS FROM A GAS STREAM

PRIORITY CLAIM

The present application claims priority from PCT/EP2011/071365, filed 30 Nov. 2011, which claims priority from European application 10193844.7, filed 6 Dec. 2010, which is incorporated herein by reference.

The invention relates to a process for removing mercaptans from a gas stream.

Generally, natural gas comprises mainly methane and can further comprise other components such as higher hydrocarbons (e.g. ethane, propane, butanes, pentanes). In addition, it may also comprise significant amounts of undesired sulphur contaminants and carbon dioxide.

Common sulphur contaminants are hydrogen sulphide ($H_2S$), mercaptans (RSH), also referred to as thiols, and carbonyl sulphide (COS).

One process for removing hydrogen sulphide, COS and carbon dioxide uses an amine-containing absorption liquid based on a chemical absorbent, also referred to as selective amine absorption process. In this process, a gas stream comprising hydrogen sulphide, COS and carbon dioxide is contacted with the amine-containing absorption liquid in an absorption unit, also referred to as amine treating unit. The hydrogen sulphide, COS and carbon dioxide are selectively absorbed in the amine-containing absorption liquid and thereby removed from the gas stream.

A disadvantage of such a process is that it does not provide an efficient absorption of mercaptans.

A well known adaption of this selective absorption process is obtained by using an amine-containing absorption liquid based on a mixed absorbent, i.e. a mixture comprising both a chemical absorbent and a physical absorbent, e.g. sulfinol. Such a mixed absorption liquid can also capture the mercaptans from the gas stream. Such a process is for instance described in WO2010060975. A disadvantage of the use of mixed absorption liquids is that also $C2^+$ hydrocarbons, also referred to as condensates are absorbed together with the sulphur contaminants and the carbon dioxide. As these condensates are valuable products, an additional separation of the condensates from the sulphur contaminants and the carbon dioxide is required.

Alternatively, a natural gas, from which the hydrogen sulphide and carbon dioxide have been removed by for instance treatment with a selective amine absorption process, is further treated to remove mercaptans by a process as for instance provided in U.S. Pat. No. 4,705,620. In this process, which is typically used to remove mercaptans from LPG, propane, butanes, light naphthas, kerosene and jet fuel, the mercaptans are removed by converting them by oxidation to liquid hydrocarbon disulfides. The mercaptans are reacted in water with a stoichiometric amount of caustic to form the corresponding sodium salts, e.g. $CH_3$—S—Na. This salt is oxidized with air to form an disulphide, e.g. $CH_3$—SS—$CH_3$, and NaOH, which will be recycled. A disadvantage of this process is its large sensitivity to the presence of hydrogen sulphide and carbon dioxide. Being acids, these compounds react with the caustic, thereby irreversibly consuming the caustic. Therefore, such a mercaptan oxidation process is always preceded by a hydrogen sulphide and carbon dioxide removal unit, such as a selective amine absorption, as described herein above. Even with a hydrogen sulphide and carbon dioxide removal pre-treatment, caustic consumption remains significant due to residual hydrogen sulphide and carbon dioxide in the feed to the oxidation process.

There is a need for a process for removing mercaptans from gas streams that is less sensitive to the presence of hydrogen sulphide and carbon dioxide and which is selective for mercaptans, without absorbing significant amounts of condensate.

It has now been found that mercaptan contaminants may be removed from a gas stream through a reversible absorption step by contacting the mercaptan-comprising natural gas stream with a specific substituted organic disulphide in combination with at least catalytic amounts of a nitrogen-containing base.

Accordingly, the present invention provides a process for removing mercaptans from a gas stream gas stream, comprising the steps:

a) providing a first mercaptan-comprising gas stream comprising at least a mercaptan of the general formula:

wherein $R_1$ is an alkyl group comprising 1 to 4 carbon atoms; and b) contacting the mercaptan-comprising gas stream with an absorption medium comprising a substituted disulphide and a nitrogen-containing base to obtain a second mercaptan-depleted gas stream,
wherein:
the amount of the substituted disulphide used in the absorption medium is chosen on the basis of at least equimolarity to the amount of the mercaptan that is to be removed; and
at least a catalytic amount of the nitrogen-containing base is present in the absorption medium; and
the substituted disulphide is of the general formula

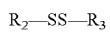

wherein:
$R_2$ and $R_3$ are carbon comprising substituents of which the corresponding $R_2$—SH and $R_3$—SH thiols have a vapour pressure below the vapour pressure of any $R_1$—SH thiol; and
at least one of $R_2$ and $R_3$ is an electron withdrawing group.

The process according to the present invention allows for the reversible absorption of mercaptans from the natural gas and efficient purification thereof.

Additionally, the process according to the invention provides the possibility of reducing any hydrogen sulphide, carbon dioxide, water and/or COS content in the natural gas. It may be incorporated into existing selective amine process thereby omitting the need to subject the natural gas stream to a prior hydrogen sulphide and carbon dioxide removal process.

In GB 1551344, a process is described using organic disulphides as absorbent for contaminating gaseous sulphur compounds from gas streams. Although it is mentioned that the gas stream may contain methyl mercaptan, the process is in particular directed to the removal of $H_2S$ from gas streams. It was further disclosed that methanolamine, a nitrogen-containing base, may be present as an additional absorbent. However, this was found to lead to less selectivity for removal of $H_2S$ over $CO_2$. In contrast, according to the present invention, the presence of at least catalytic amounts of a nitrogen-containing base is necessary for efficient removal of mercaptans.

Further, WO 2009/156621 describes an absorbent solution for deacidification of gaseous effluents, containing organosulphur compounds bearing a carbonyl group as degradation inhibitors for the absorbent solution. Although WO 2009/156621 also refers to the use of organic disulphides, it does not disclose findings relating to the removal of mercaptans; it specifically deals with degradation inhibitory activity of certain organosulphur compounds.

In another aspect the invention provides a substituted disulphide solution, for use as an absorption medium for removing mercaptans from a gas stream, comprising:
a) a substituted disulphide of the general formula:

$$R_2\text{—SS—}R_3$$

wherein:
$R_2$ and $R_3$ are carbon comprising substituent of which the corresponding $R_2$—SH and $R_3$—SH thiols have a vapour pressure below the vapour pressure of any butyl-SH thiol, and at least one of $R_2$ and $R_3$ is an electron withdrawing group, and
b) an aliphatic alkanolamine,
wherein
the amount of the substituted disulphide constitutes 1-10 mass % of the substituted disulphide solution; and the aliphatic alkanolamine is present in at least 3 mol % with regard to the amount of the substituted disulphide.

In an embodiment of the invention, the substituted disulphide solution is non-aqueous.

In a further aspect the invention relates to an amine adsorption unit suitable for absorbing mercaptans, hydrogen sulphide and carbon dioxide, comprising an amine-containing absorption liquid comprising or consisting of the substituted disulphide solution according to the present invention.

In the process according to the present invention mercaptans are removed from a mercaptan-comprising gas stream.

The mercaptan-comprising gas steam comprises at least mercaptans of the general formula:

$$R_1\text{—SH} \quad (1)$$

wherein $R_1$ is an alkyl group comprising 1 to 4 carbon atoms.

Reference herein to mercaptans (R—SH) is to aliphatic mercaptans. The invention especially involves removal of methyl mercaptan (R=methyl), ethyl mercaptan (R=ethyl), normal- and iso-propyl mercaptan (R=n-propyl and i-propyl) and butyl mercaptan (R=butyl) isomers. These mercaptans have vapour pressures the range of from 5 to 210 kPa measured at 25° C.

In step (b) of the process according to the invention the mercaptan-comprising gas stream is contacted with an absorption medium. The absorption medium comprises a substituted disulphide of the general formula:

$$R_2\text{—SS—}R_3 \quad (2)$$

wherein:
$R_2$ and $R_3$ are carbon comprising substituent of which the corresponding $R_2$—SH and $R_3$—SH thiols have a vapour pressure below the vapour pressure of any $R_1$—SH thiol, preferably below the vapour pressure of any butyl thiol.

Reference herein to the vapour pressure of a thiol is to the vapour pressure of a thiol as measured at 25° C. according to ASTM E1194 for thiols having a vapour pressure in the range of from $1\times10^{11}$ to 1 kPa and ASTM 2879 for thiols having a vapour pressure above 1 kPa, wherein in case of doubt the vapour pressure according to the method of ASTM E1194 takes precedents. In case a thiol has a vapour pressure below $1\times10^{-11}$ kPa, the vapour pressure of the thiol is for the purposes of the invention considered to be zero.

Without wishing to be bound to any particular theory, it is believed that the $R_1$SH mercaptan reversibly reacts with the substituted disulphide in the absorption medium. During this reaction with the substituted disulphide, at least one of $R_2$—SH and $R_3$—SH thiol is formed together with a $R_2$—SS—$R_1$ and/or $R_1$—SS—$R_3$ disulphide, although energetically less favourable, minor amounts of $R_1$—SS—$R_1$ may be formed. Due to the higher vapour pressure of the formed thiols, the process conditions under which mercaptan-comprising gas stream is contacted with an absorption medium can easily be chosen such that most of or essentially all of the formed thiols remain captured in the absorption medium in solid, liquid or dissolved form together with the newly formed substituted disulphides, which generally have low vapour pressures.

Preferably, $R_2$ and $R_3$ are carbon comprising substituents of which the corresponding $R_2$—SH and/or $R_3$—SH thiols have a vapour pressure below 1 kPa, more preferably below 0.5 kPa, even more preferably 0.01 kPa, still even more preferably 0.001 kPa as determined as defined herein above.

$R_2$ and $R_3$ may be the same or different. In case $R_2$ and $R_3$ are the same, the variety of thiols formed is reduced, making the selection of the operation conditions and optional regeneration conditions easier. In case $R_2$ and $R_3$ are different, one of them is an electron withdrawing group and the other may be another electron withdrawing group or another suitable group as further defined herein. Preferably, $R_2$ and $R_3$ are different. Different substituents have a different tendency to react with the $R_1$—SH in the feed stream. By selecting $R_2$ and $R_3$ such that the tendency to react with the $R_1$—SH is significantly different, the formation of undesired $R_1$—SS—$R_1$ can be reduced if not essentially prevented.

According to the invention, the amount of the substituted disulphide in the absorption medium used in the process of this invention is chosen on the basis of at least equimolarity to the amount of the mercaptan that is to be removed. Preferably, the amount of the substituted disulphide constitutes 0.001-10% m/m of the absorption medium used in the process of this invention, preferably 0.01-10% m/m and more particularly 0.01-5% m/m.

In a further embodiment of the invention, the amount of the substituted disulphide present in the substituted disulphide solution of this invention is chosen on the basis of at least equimolarity to the amount of the mercaptan that is to be removed. Preferably, the amount of the substituted disulphide constitutes 0.001-10% m/m of the absorption medium used in the process of this invention, preferably 0.01-10% m/m and more particularly 0.01-5% m/m.

The absorption medium comprises a nitrogen-containing base. Preferably, the base is an amine-containing base. The nitrogen-containing base catalyses the reaction between the substituted disulphide and the $R_1$SH mercaptan. In the absence of a nitrogen-containing base the reaction proceeds hardly notable. Therefore, according to the present invention, at least a catalytic amount of the nitrogen-containing base must be present in the absorption medium, wherein the term "catalytic" refers to the action of the base to significantly accelerate (meaning an acceleration of time of reaction with a factor of more than 10, preferably more than 100) the reaction between the $R_1$SH mercaptan and the substituted disulphide. To such extent, an amount of at least 3 mol %, preferably at least 5 mol % of the nitrogen-containing base should be present with regard to the amount of the substituted disulphide. In addition, the nitrogen-containing base may reversibly react with acid components in the mercaptan-comprising gas stream, such as any hydrogen sulphide, carbon dioxide and/or COS in the mercaptan-comprising gas stream. Therefore, sufficient nitrogen-containing base must be added to ensure that at any stage in the process a catalytic amount of unreacted or free nitrogen-containing base is present in the absorption medium as the absorption medium is contacted with the mercaptan-comprising gas stream. The required concentration of nitrogen-containing base can be determined based on the expected amount of base that will be necessary to reversible bond with any acid components in the gas stream. Based on the acid component content of the mercaptan-comprising gas stream and the volume of mercaptan-comprising gas stream contacted per unit absorption medium, the minimum amount of base required can be easily determined.

The absorption medium may be a liquid or solid absorption medium, more preferably it is a liquid absorption medium, i.e. it is liquid under the conditions at which it is contacted with the mercaptan-comprising gas stream. The absorption medium may for instance be a liquid disulphide with the base dissolved therein or a liquid base with the disulphide dissolved therein.

The absorption medium may be in the form of a solution, suspension or emulsion. Preferably, the absorption medium is a liquid solution comprising the substituted disulphide and the nitrogen-containing base dissolved therein. More preferably, the absorption medium is an aqueous solution comprising the substituted disulphide and the nitrogen-containing base dissolved therein.

A preferred absorption medium is an aqueous amine-containing absorption liquid. Particularly suitable aqueous amine-containing absorption liquids are those that are generally used for removing so-called acid gases such as hydrogen sulphide, carbon dioxide and/or COS from a gas stream containing these compounds. These aqueous amine-containing absorption liquids have been extensively described in the art. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series.

On an industrial scale, such absorption liquids are in principal classified in two categories, depending on the mechanism to absorb the acidic components: chemical absorbents and physical absorbents. Reference herein to a chemical absorbent is to a liquid that absorbs an acid gas by a reversible chemical reaction. Reference herein to a physical absorbent is to a liquid that absorbs an acid gas by a physical solution/dissolution process, examples of physical absorbents include cyclo-tetramethylenesulfone and its derivatives, aliphatic acid amides, N-methylpyrrolidone, N-alkylated pyrrolidones and the corresponding piperidones, methanol, ethanol and mixtures of dialkylethers of polyethylene glycols or mixtures thereof. Physical absorbents are generally used in combination with chemical absorbents. Such combinations are referred to as mixed absorbents. Each absorbent has its own advantages and disadvantages with respect to features as loading capacity, kinetics, regenerability, selectivity, stability, corrosivity, heating/cooling requirements etc.

In the process according to the present invention chemical absorbent-based absorption liquids are preferred as they do not significantly absorb condensate components in the mercaptan-comprising gas stream. Reference herein to condensates is to C2+ hydrocarbons including BTX (benzene, toluene and xylene) components. Physical absorbents do absorb condensate components, thereby undesirably removing these valuable condensate components from the gas stream. Herein, reference to chemical absorbent-based absorption liquids is to absorption liquid that rely on a reversible chemical reaction to absorb an acid gas, in the absence of significant amounts of physical absorbents, preferably the chemical absorbent-based absorption liquids comprises in the range of from 0 to 15 wt % of a physical absorbent, more preferably of from 0 to 5 wt %, even more preferable 0 to 1 wt % of a physical absorbent based on the weight to the total absorbent.

The chemical absorbents, which are useful in the process of the present invention, preferably, comprise an aliphatic alkanolamine and a primary or secondary amine as activator, the action of which accelerates the rate of $CO_2$ absorption. The chemical absorbent may further comprise water or another suitable solvent. Preferred aliphatic alkanolamines include monoethanolamine (MEA), di-isoproponalamine (DIPONA) and tertiary alkanolamines, especially triethanolamine (TEA) and/or methyldiethanolamine (MDEA). Suitable activators include primary or secondary amines, especially those selected from the group of piperazine, methylpiperazine and morpholine. Preferably, the chemical absorbent comprises in the range of from 1.0 to 5 mol/l, more preferably from 2.0 to 4.0 mol/l of aliphatic alkanolamine. Preferably, the chemical absorbent comprises in the range of from 0.5-2.0 mol/l, more preferably from 0.5 to 1.5 mol/l of the primary or secondary amine as activator. Especially preferred is a chemical absorbent comprising MDEA and piperazine. Most preferred is a chemical absorbent comprising in the range of from 2.0 to 4.0 mol/l MDEA and from 0.8 to 1.1 mol/l piperazine. These chemical absorbent-based absorption liquids contain a nitrogen-containing base and have the additional advantage that they efficiently remove carbon dioxide, COS and hydrogen sulphide from the mercaptan-comprising gas stream, if present, in particular at high pressures.

In a preferred embodiment, the process according to the present invention is incorporated in a conventional amine-based separation process for removing hydrogen sulphide and carbon dioxide from a gas stream comprising hydrogen sulphide and/or carbon dioxide.

Reference herein to an amine-based separation process is to a process comprising an amine-containing absorption liquid. The amine based separation process is typically performed in an amine treating unit. Such amine treating units are well known for extracting hydrogen sulphide and/or carbon dioxide from gas stream. These amine treating units generally are based on a contactor (also referred to as absorber) for contacting a gaseous stream with a liquid absorbent. The amine based separation process is based on a washing process wherein a gas stream is washed with a chemical absorbent, in particular an aqueous amine solution. The gas stream is separated by chemical adsorption of certain components. i.e. hydrogen sulphide and carbon dioxide, in the gas stream (solvent extraction).

By adding, according to the present invention, a substituted disulphide to, and preferably dissolving it in, the amine-containing absorption liquid, the absorption medium comprising the substituted disulphide and nitrogen-containing base according to the present invention is obtained whereby the amine-containing absorption liquid provides both the absorption medium and the nitrogen-containing base.

By incorporating a process according to the present invention in an amine-based separation process as described herein above, advantageously not only $R_1$—SH mercaptans are removed from the mercaptan-gas stream, but also any hydrogen sulphide and carbon dioxide present in the gas stream may be removed without the need for a separate hydrogen sulphide and carbon dioxide removal process.

As mentioned herein above, during step (b) of the process $R_1$—SH mercaptans are removed from the mercaptan-comprising gas stream. At the same time, the absorption medium is loaded with the reaction products of the reaction between the $R_1$—SH mercaptans and the $R_2$—SS—$R_3$.

Preferably, the loaded absorption medium is regenerated and recycled back to step (b) of the process, while the desorbed mercaptans, and optionally hydrogen sulphide, carbon dioxide and COS, are retrieved separately. Therefore, preferably, the process further comprises the steps:

c) retrieving the absorption medium from step (b);
d) regenerating the absorption medium
e) providing the regenerated absorption medium to step (b).

The reaction between the $R_1$—SH mercaptans and the $R_2$—SS—$R_3$ is an equilibrium reaction. By withdrawing $R_1$—SH mercaptans in a regeneration step, the $R_1$—SH mercaptan absorption reaction is reversed and $R_1$—SH mercaptans are obtained.

The loaded absorption medium may be regenerated by stripping the loaded absorption medium with a gas, such as nitrogen or steam.

Preferably, the loaded absorption medium is regenerated by subjecting the absorption medium to an elevated temperature, preferably a temperature in the range of from 80 to 200° C., even more preferably of from 100 to 175° C. By subjecting the loaded absorption medium to an elevated temperature, the desorption process is advantaged and in addition, this allows for an efficient desorption of hydrogen sulphide, carbon dioxide and COS, if these were absorbed from the mercaptan-comprising gas stream.

Preferably, the loaded absorption medium is regenerated by stripping the loaded absorption medium with a gas at elevated temperatures, such as those temperatures mentioned herein above.

In case the process according to the present invention is incorporated in an amine-based separation process as described herein above, the regeneration process for regenerating the amine-based absorption liquid of the amine-based separation process may be used to regenerate the substituted disulphide in the absorption medium.

It is preferred that the nitrogen-containing base is retained in the phase that is recycled back to step (b).

The process according to the invention may be operated in batch, semi continuous or continuous mode. Preferably, the process is operated in continuous mode, more preferably by passing the mercaptan-comprising gas stream and separately a stream of absorption medium through a contactor, wherein both streams are continuously contacted. A mercaptan-depleted gas stream, (or second gas stream) is continuously retrieved from the contactor, while simultaneously a stream of loaded absorption medium is retrieved from the contactor. The stream of loaded absorption medium is preferably sent to a regeneration unit to be regenerated and recycled to the inlet of the contactor. The mercaptan-comprising gas stream and a stream of absorption medium are preferably contacted counter-currently. By contacting the mercaptan-comprising gas stream and the stream counter currently, the mercaptan-comprising gas stream is contacted with fresh or freshly regenerated absorption medium, comprising the highest amount of nitrogen-containing base prior to exiting the contactor. This significantly reduces that effect of any acid compounds in the mercaptan-comprising gas stream on the concentration of unbound base in the absorption medium.

The mercaptan-comprising gas stream is preferably contacted with the absorption medium at a temperature in the range of from 0 to 100° C., more preferably of from 10 to 70° C., even more preferably 20 to 60° C. By reducing the temperate the choice of liquid and/or solid absorption media becomes broader.

The mercaptan-comprising gas stream is preferably contacted with the absorption medium under any suitable pressure, preferably a pressure in the range of from 1 to 150 bar absolute, more preferably, 20 to 100 bar absolute, even more preferably 30 to 75 bar absolute.

In case of a continuous process wherein both mercaptan-comprising gas and the absorption medium are continuously contacted, the mercaptan-comprising gas may preferably be supplied to the process at any suitable ratio to the absorption medium. Preferably, the weight ratio of the mercaptan-comprising gas flow ($kg_{gas}$/h) to the flow of absorption medium ($kg_{medium}$/h) is in the range of from 0.1 to 100.

The substituted disulphide may be any substituted disulphide according to general formula (2).

$R_2$ and $R_3$ may be any suitable substituent. Preferably, $R_2$ and $R_3$ are chosen such that the corresponding $R_2$—SH and/or $R_3$—SH thiol have a boiling temperature above the temperature of the mercaptan-comprising gas stream. More preferably, $R_2$ and $R_3$ are chosen such that the corresponding $R_2$—SH and/or $R_3$—SH thiols are liquid or dissolved in the absorption medium at the temperature and pressure conditions at which the mercaptan-comprising gas stream is contacted with the absorption medium.

At least one of $R_2$ and $R_3$ is an electron withdrawing group.

Electron withdrawing groups are well known in the art, and are for example selected from:

substituted alkyl comprising at least 5 carbon atoms, preferably comprising at least 7 carbon atoms, more preferably at least 10;

optionally substituted aryl comprising 6 to 14 carbon atoms (such as phenyl, naphthyl, toluoyl, and the like); or optionally substituted heteroaryl group comprising 5 to 13 carbon atoms (such as pyrolyl, thiophenyl, furanyl and pyridinyl);

wherein each of the substituents may be selected from one or more —OH, —SH, halogen (preferably fluoro), carboxylic acid, carboxylate, amino (for example —$NH_2$, —NH(alkyl), —N(alkyl)$_2$, wherein the alkyl group comprises 1 to 6 carbon atoms and may be substituted with —OH), nitro, ether and thioether (such as —O—((C1-C4)alkyl) and —S—((C1-C4) alkyl)), ester (such as —O—C(O)—((C1-C4)alkyl), —C(O)—O—((C1-C4)alkyl), and the like), sulfonic acid, sulfonyl (such as ((C1-C4)alkyl)sulfonyl, tosylsulfonyl and the like), sulfonate groups (such as ((C1-C4)alkyl)sulfonate, triflate, tosylate and besylate), and the like.

Alkyl groups as mentioned herein may be branched or unbranched alkyl groups. The term (C1-C4)alkyl refers to an alkyl group with 1 to 4 carbon atoms.

Further suitable $R_2$ and $R_3$ groups include:

alkyl groups comprising at least 5 carbon atoms, preferably comprising at least 7 carbon atoms, more preferably at least 10;

alkenyl groups comprising at least 5 carbon atoms, preferably comprising at least 7 carbon atoms, more preferably at least 10;

alkynyl groups comprising at least 5 carbon atoms, preferably comprising at least 7 carbon atoms, more preferably at least 10;

cycloalkyl groups comprising at least 5 carbon atoms;

alkoxy groups, including ketones, aldehydes, (poly)ethers, (poly)esters, carboxylic acid and carboxylate groups;

amine and amino groups;

polymers;

wherein the alkyl group is defined as mentioned herein before.

Suitable $R_2$ and $R_3$ substituents further include substituents comprising a combination of any of the functional groups mentioned herein above, for example a combined aryl and alkanol group such as a phenolic substituent group. In case an alkyl, alkenyl or alkynyl is combined with another functional group to from a substituent an alkyl, alkenyl or alkynyl comprising any number of carbon atoms may be used such as for instance ethylphenylic substituent group.

Reference herein to aryl groups is to comprising one or more aromatic ring structures, including polycyclic and naphthenic ring structures, for example 2, 2'-dithiobisbenzothiazole.

Reference herein to substituted aryl groups is to aryl groups comprising one or more phenyl rings, wherein the aryl group further comprises at least one other functional group, for example benzoic acid.

Preferred $R_2$ and $R_3$ substituents comprise electron deficient (electron withdrawing) functional groups such as aromatic groups, carboxylate groups and groups comprising unsaturated carbon-carbon bonds. Such substituents result in a disulphide with a higher tendency to react with the $R_1$—SH mercaptan.

Preferred $R_2$ and $R_3$ substitutes comprise both electron deficient functional groups as well as hydrophilic functional groups, such as those that can form hydrogen bonds. Examples of hydrophilic functional groups include alcohols, acids, carboxylates, amines, sulphuric and sulphurous groups. Such hydrophilic functional groups increase the tendency of the substituted disulphide to interact, and preferably dissolve, in alkaline, preferably aqueous alkaline, liquids.

Particularly preferred $R_2$ and $R_3$ substitutes comprise both electron deficient functional groups as well as functional groups that improve the solubility of the disulphide, as well as the formed $R_2$SH and/or $R_3$SH thiols and $R_1$ comprising disulphides, in chemical-based absorption liquids, examples of such functional groups include acids, amines, alcohols and polyethylene glycols.

Preferably, the $R_2$—SS—$R_3$ substituted disulphide is soluble in the absorption medium, preferably an aqueous absorption medium, in the presence of the nitrogen-containing base. More preferably, the obtained $R_2$—SS—$R_1$ and/or $R_1$—SS—$R_3$ are also soluble in the absorption medium, preferably an aqueous absorption medium, in the presence of the nitrogen-containing base. More preferably, the obtained $R_2$—SH and $R_3$—SH are also soluble in the absorption medium, preferably an aqueous absorption medium, in the presence of the nitrogen-containing base.

Selection of the right substituents $R_2$ and $R_3$ depends on the nature of the absorption medium and is, based on the information provided herein above, within the general knowledge of the skilled person.

In case, at least one of substituents $R_2$ and $R_3$ is a alkyl thiol, the obtained $R_2$—SH and $R_3$—SH may be dithiols.

Preferred substituted disulphides include, but are not limited to: diphenyl disulphide, ditolyl disulphide, di-nitrophenyl disulfide, dithiodibenzoic acid, di-(oligoethyleneglycol-phenyl)disulphide, dinaphtyl disulphide, dipyridyl disulphide, 2,2'-dithiobisbenzothiazole.

Particularly preferred substituted disulphides, as they dissolve well in the chemical-based absorption liquids mentioned herein above, include, but are not limited to: dithiodibenzoic acid, dithiodi(potassium benzoate) and di-(oligoethyleneglycol-phenyl) disulphide.

In one particular embodiment, at least one of substituents $R_2$ and $R_3$ is a polymer. Polymeric thiols have very low to almost no vapour pressure. The polymer-based disulphide may be provided as a solid absorption medium or as a dispersion in a liquid medium.

The mercaptan-comprising gas stream may be any gas stream comprising mercaptans. Preferably, the mercaptan-comprising gas stream is natural gas. Reference herein to natural gas is to a gas, which generally comprises mainly methane and can further comprise other components such as higher hydrocarbons. The higher hydrocarbons are typically referred to as condensate or condensate components and may include e.g. ethane, propane, butanes, pentanes, benzene, toluene and xylenes. Natural gas may further include components such as nitrogen, carbon dioxide, sulphur contaminants and mercury. The amount and type of sulphur contaminants can vary. Common sulphur contaminants are hydrogen sulphide ($H_2S$), mercaptans (RSH) and carbonyl sulphide (COS).

It will be appreciated that the composition of the natural gas stream depends on the natural gas field it is extracted from. Typically, the natural gas comprises predominantly methane, preferably in the range of from 40 to 99 vol % methane, more preferably 60 to 99 vol % methane, more preferably 60 to 99 vol % methane, based on the total mercaptan-comprising natural gas stream.

Preferably, the amount of mercaptans in the gas stream supplied to process is in the range of from 1 ppmv to 5 vol %, based on the total mercaptan-comprising gas stream, preferably from 5 ppmv to 5 vol %, more preferably from 6 ppmv to 3 vol %, still more preferably from 10 ppmv to 1500 ppmv.

The mercaptan-comprising gas stream may also comprise other components such as one or more of hydrogen sulphide, carbon dioxide, water, $C^{2+}$ hydrocarbons or COS. Preferably, the gas stream comprises no or essentially no oxygen (less than 1 ppm).

In case the mercaptan-comprising gas stream comprises hydrogen sulphide, the mercaptan-comprising gas stream preferably comprises up to 50 vol %, more preferably in the range of from 0.1 ppmv to 50 vol %, even more preferably of from 0.2 to 25 vol % of hydrogen sulphide, based on the total mercaptan-comprising gas stream.

Preferably, the mercaptan-comprising gas stream comprises in the range of from 0 to 40 vol % carbon dioxide, preferably of from 0 to 30 vol % carbon dioxide, based on the total mercaptan-comprising gas stream.

In case the mercaptan-comprising gas stream comprises COS, the mercaptan-comprising gas stream preferably comprises in the range of from 0.1 to 5000 ppmv, more typically 0.1 ppmv to 2500 ppmv of COS, based on the total mercaptan-comprising gas stream.

In case the mercaptan-comprising gas stream comprises mercury it is preferred that the mercury is removed.

Preferably, the mercaptan-comprising gas stream comprises little to no hydrogen and/or carbon monoxide, more preferably no more than 20 vol % based on the total volume of the mercaptan-comprising gas stream, even more preferably, no more than 1 vol % hydrogen and/or carbon monoxide. At prolonged contact times these components may irreversibly react with some of the disulphide.

In another aspect the invention relates to a substituted disulphide solution, wherein the substituted disulphide and the aliphatic alkanolamine are those described herein above for the process according to the invention and are mutatis mutandis subject to the same preferences described herein above for the process according to the invention. Preferably, the substituted disulphide solution further comprises water.

Preferably, the substituted disulphide solution is a chemical absorbent-based absorption liquid, as described herein above for the process according to the invention, with the substituted disulphide dissolved therein. Such a substituted disulphide solution is particularly suitable as absorption medium in the process according to the present invention.

In a further aspect the invention relates to an amine treating unit suitable for absorbing mercaptans, hydrogen sulphide and carbon dioxide, comprising an inlet suitable for receiving a mercaptan-comprising gas stream, optionally comprising acid components such as hydrogen sulphide and/or carbon dioxide, an inlet for receiving an amine-containing absorption liquid. Further comprising an outlet for a mercaptan-depleted gas stream, or second gas stream, and an outlet for amine-containing absorption liquid. Also comprising a contactor suitable for contacting a gaseous stream with a liquid stream. Wherein, the amine treating unit comprises an amine-containing absorption liquid comprising or consisting of the substituted disulphide solution according to the present invention.

The invention is illustrated by the following non-limiting examples.

EXAMPLE 1

Experiments were conducted to show the reaction between a mercaptan and a substituted disulphide. In the experiments a dodecanethiol was used to mimic a C1 to C4 mercaptan present in the gas stream according to the present invention. This was done in view of safety considerations involved with the use of C1 to C4 mercaptans.

(a) 49 mg (0.22 mmol) of diphenyl disulphide (Ph-SS-Ph) together with 46 mg of dodecanethiol ($C_{12}H_{25}$—SH, 0.23 mmol) was weighed into $CDCl_3$ in a NMR tube. The conversion at room temperature was followed by NMR. After 3 days <5% conversion had taken place.

(b) 118 mg (0.54 mmol) of Ph-SS-Ph was weighed into a NMR tube. In a vial, 46 mg (0.23 mmol) of $C_{12}H_{25}$—SH as dissolved in $CDCl_3$ (0.5 ml) and added to the NMR tube. A NMR spectrum was taken of the mixture displaying both compounds. No reaction products were observed confirming that no reaction has taken place.

Subsequently, 15 mol % of $NEt_3$ (triethyl amine) base, based on the number of moles Ph-SS-Ph, was added to the mixture in the NMR tube and the extent of the reaction was monitored by taking NMR spectra while keeping the tube at 25° C.

The extent of the reaction was monitored by the appearance of the Ph-SS—$C_{12}H_{25}$ signal. Immediately following the addition of the base, the formation of Ph-SS—$C_{12}H_{25}$ was observed. In addition, formation of $C_{12}H_{25}$—SSC—$_{12}H_{25}$ was also observed, but this is a minor product (<5%). In table 1 the normalised concentration of dodecanethiol, i.e. the concentration at any time divided by the initial concentration, is given versus the time.

It will be clear from table 1 that in the presence of a base that the dodecanethiol is removed from the solution and converted to a corresponding substituted disulphide and phenylthiol.

TABLE 1

| time [min] | Normalised $C_{12}H_{25}SH$ conc. [-] |
|---|---|
| 0 | 1.0 |
| 2 | 0.96 |
| 4 | 0.90 |
| 7 | 0.84 |
| 10 | 0.78 |
| 19 | 0.62 |
| 67 | 0.29 |

EXAMPLE 2

Stock solutions of Ph-SS-Ph (462 mg in 3 ml $C_2H_4Cl_2$, 0.7 M), $C_{12}H_{25}$—SH (57 mg in 3 ml $C_2H_4C_{12}$, 0.09 M) and $NEt_3$ (354 mg in 5 ml $C_2H_4Cl_2$, 0.07 M) were prepared. A predetermined amount of the solutions of Ph-SS-Ph (0.1 or 0.2 ml) and $C_{12}H_{25}$—SH (0.1 or 0.2 ml) were combined in a cuvet and additional $C_2H4C_{12}$ was added such that after addition of the $NEt_3$ solution the total volume would become 0.6 ml.

Using a UV-spectrometer, a background absorption spectrum was measured.

A timed measurement was started (typically, a spectrum every minute), and the solution of $NEt_3$ (0.1 or 0.2 ml) was added. After vigorous stirring, the reaction was monitored by UV absorption and kept at room temperature. Depending on the concentration, the reaction extend was monitored at 360-380 nm by the disappearance of the Ph-SS-Ph absorption, which was fitted by an exponential decay curve to determine the speed of the reaction.

As can be seen from table 2, it was shown that the speed of the reaction increases with the concentration of both Ph-SS-Ph and $NEt_3$, as shown by the $t_{1/2}$ values, which represent the time at which 50 mol % of the initial dodecane thiol concentration has reacted.

EXAMPLE 3

In a procedure similar to example 2, an experiment was performed using PhSSPh (19 mg) and $C_{12}H_{25}SH$ (4 mg) in $C_2H_4Cl_2$ (0.6 ml), whereby the $NEt_3$ base was replace by MDEA, which is an amine-based base typically found in chemical absorbent-based amine absorption liquids. After addition of a MDEA (0.1 ml), the speed of the reaction was judged by the decay of the UV-vis absorption signal, and can be found in Table 2, showing that MDEA behaves similar to $NEt_3$.

TABLE 2

| | PhSSPh Conc. [mol/l] | $C_{12}H_{25}SH$ Conc. [mol/l] | Base Conc. [mol/l] | $t_{1/2}$ [$min^{-1}$] |
|---|---|---|---|---|
| Expl. 2 | | | | |
| | 0.2 | 0.02 | 0.2 | 3.2 |
| | 0.2 | 0.02 | 0.1 | 7.2 |
| | 0.1 | 0.02 | 0.1 | 10.2 |
| | 0.1 | 0.02 | 0.2 | 5.7 |
| | 0.15 | 0.02 | 0.15 | 5.8 |
| Expl. 3 | | | | |
| | 0.123 | 0.02 | 1.03 | 10.1 |

EXAMPLE 4

A further experiment was conducted to show ability of the absorption medium comprising a substituted disulphide and amine base to capture C1 to C4 mercaptans from a gas phase.

In a batch experiment, i.e. without regeneration, 25 ml of an amine-containing solution was contacted with a methylmercaptan-containing gas by passing a nitrogen gas stream containing 1 vol % of methylmercaptan, based on the total gas stream, through the amine-containing solution at atmospheric pressure and a temperature of 20° C. A flow rate of 0.5 Nl/h was applied. The solution was continuously stirred at 250 rpm. The tested amine solutions are provided in table 3. In example 4a and 4b an organic solution was used, while an examples 4c and 4d an aqueous solution is used. In example 4c, a solution of MDEA in water was used, such a solution is a common part of a chemical absorbent-based absorption liquid used in typical amine treating units suitable for absorbing hydrogen sulphide and carbon dioxide.

The methylmercaptan breakthrough, i.e. the concentration in the effluent gas stream at any time divided by the originally methylmercaptan concentration in the nitrogen gas stream, was determined.

In Table 3, time required to reach a methylmercaptan breakthrough of 0.5 is shown for each of the tested solutions.

The methylmercaptan breakthrough, i.e. the concentration in the effluent gas stream at any time divided by the originally methylmercaptan concentration in the nitrogen gas stream, was determined. In Table 4, time required to reach a methylmercaptan breakthrough of 0.5 is shown for each of the tested solutions.

From table 4, it can be concluded that the different water soluble disulfides bearing sufficiently electron deficient (electron withdrawing), aromatic, substituents (examples 5b-5d) are capable of greatly enhancing the mercaptan

TABLE 3

| Expl. | volume [ml] | $NEt_3$ [vol %] | MDEA [vol %] | $C_2H_4Cl_2$ [vol %] | $H_2O$ [vol %] | PhSSPh [g] | $(2-CO_2H—PhS)_2$* [g] | $CH_4SH$ breakthrough >0.5 [min] |
|---|---|---|---|---|---|---|---|---|
| 4a | 25 | 25 | — | 75 | — | — | | 300 |
| 4b | 25 | 25 | — | 75 | — | 1.5 | | >1800# |
| 4c | 25 | — | 25 | — | 75 | | — | 82.8 |
| 4d | 25 | — | 25 | — | 75 | | 0.75 | 1296 |

*2,2'-Dithiodibenzoic acid
after 1800 minutes no $CH_4SH$ breakthrough was observed It will be clear from Table 3 that the addition of a substituted disulphide to the amine-containing absorbent, in the presence of a base, results in a significant delay of the methylmercaptan breakthrough. By a continuous process, wherein the substituted disulphide-containing solution is regenerated and recycled, a continuous removal of mercaptan can be achieved.

EXAMPLE 5

A further experiment was conducted to show ability of the absorption medium comprising a substituted disulphide and amine base to capture C1 to C4 mercaptans from a gas phase.

removal capacity of the absorbent liquid as compared to the blank not containing the disulfide agent (example 5a). From example 5e, it appears that electron rich disulphides such as, in this case, alkyl substituted disulphides, are less efficient as mercaptan removal agents. Example 5f shows a mixed profile for mixed disulphides; the capacity to remove mercaptans appears to be related to the behaviour of both substituents as one skilled in the art may expect from the behaviour of the corresponding homogeneous disulphides.

TABLE 4

| Expl. | volume [ml] | MDEA [mass %] | $H_2O$ [mass %] | $R^1SSR^2$ (5 m%) | $CH_4SH$ breakthrough >0.5 [min] |
|---|---|---|---|---|---|
| 5a | 25 | 50 | 50 | — | 60 |
| 5b | 25 | 50 | 45 | $R^1=R^2=4-CO_2K—Ph$ | 600 |
| 5c | 25 | 50 | 45 | $R^1=R^2=4-(EO)_3—Ph$* | 660 |
| 5d | 25 | 50 | 45 | $R^1=R^2=4-SO_3—Ph$ | 660 |
| 5e | 25 | 50 | 45 | $R^1=R^2=KO_2C—CH_2—CH_2$ | 120** |

*EO = ethyleneoxide
**breakthrough is quick, but a slow continuing reaction is observed The experiment was conducted similar to example 4, instead a gas flow rate of 1.2 Nl/h was employed. The tested amine solutions are provided in table 4.

In all examples, a solution of MDEA in water was used, such a solution is a common part of a chemical absorbent-based absorption liquid used in typical amine treating units suitable for absorbing hydrogen sulphide and carbon dioxide.

What is claimed is:

1. A process for removing mercaptans from a gas stream gas stream, comprising the steps:
    a) providing a first mercaptan-comprising gas stream comprising at least a mercaptan of the general formula:
        $R_1—SH$,
    wherein $R_1$ is an alkyl group comprising 1 to 4 carbon atoms; and
    b) contacting the mercaptan-comprising gas stream with an absorption medium comprising a substituted disulphide and a nitrogen-containing base to obtain a second mercaptan-depleted gas stream, wherein:
the amount of the substituted disulphide used in the absorption medium is chosen on the basis of at least equimolarity to the amount of the mercaptan that is to be removed; and
at least a catalytic amount of the nitrogen-containing base is present in the absorption medium; and
the substituted disulphide is of the general formula $R_2$—SS—$R_3$ wherein:
$R_2$ and $R_3$ are carbon comprising substituents of which the corresponding $R_2$—SH and $R_3$—SH thiols have a vapour pressure below the vapour pressure of any $R_1$—SH thiol; and
at least one of $R_2$ and $R_3$ is an electron withdrawing group.

2. A process according to claim 1, wherein the absorption medium is a solution comprising the substituted disulphide and the base.

3. A process according to claim 1, wherein the absorption medium is an aqueous solution comprising the substituted disulphide and the base.

4. A process according to claim 1, wherein the absorption medium is an amine-containing absorption liquid.

5. A process according to claim 4, wherein the substituted disulphide is dissolved in the amine-containing absorption liquid.

6. A process according to claim 1, further comprising the steps:
c) retrieving the absorption medium from step (b);
d) regenerating the absorption medium; and
e) providing the regenerated absorption medium to step (b).

7. A process according to claim 6, wherein step (d) includes subjecting the absorption medium to an elevated temperature in the range of from 80 to 200° C.

8. A process according to claim 1, wherein at least one of $R_2$ and $R_3$ is an alkanol, alkoxy or aryl group.

9. A process according to claim 1, wherein the substituted disulphide is water soluble.

10. A process according to claim 1, wherein the first mercaptan-comprising gas stream comprises hydrogen sulphide and/or carbon dioxide.

11. A substituted disulphide solution, comprising:
a. a substituted disulphide of the general formula:

$R_2$—SS—$R_3$ wherein:
$R_2$ and $R_3$ are carbon comprising substituent of which the corresponding $R_2$—SH and $R_3$—SH thiols have a vapour pressure below the vapour pressure of any butyl-SH thiol, and at least one of $R_2$ and $R_3$ is an electron withdrawing group, and
b. an aliphatic alkanolamine,
wherein
the amount of the substituted disulphide constitutes from 1 to 10 mass % of the substituted disulphide solution; and
the aliphatic alkanolamine is present in the substituted disulphide solution at least 3 mol % with regard to the amount of the substituted disulphide.

12. The substituted disulphide solution of claim 11, wherein the solution is non-aqueous.

* * * * *